(12) United States Patent
Zhang et al.

(10) Patent No.: US 9,355,436 B2
(45) Date of Patent: May 31, 2016

(54) METHOD, SYSTEM AND COMPUTER PROGRAM PRODUCT FOR ENHANCING A DEPTH MAP

(71) Applicant: Texas Instruments Incorporated, Dallas, TX (US)

(72) Inventors: Buyue Zhang, Plano, TX (US); Aziz Umit Batur, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 349 days.

(21) Appl. No.: 13/659,478

(22) Filed: Oct. 24, 2012

(65) Prior Publication Data

US 2013/0100125 A1   Apr. 25, 2013

Related U.S. Application Data

(60) Provisional application No. 61/550,686, filed on Oct. 24, 2011.

(51) Int. Cl.
*G06T 15/00* (2011.01)
*G06T 5/00* (2006.01)
*H04N 13/00* (2006.01)

(52) U.S. Cl.
CPC ............... *G06T 5/005* (2013.01); *G06T 15/00* (2013.01); *G06T 2200/04* (2013.01); *G06T 2207/10028* (2013.01); *G06T 2207/20012* (2013.01); *H04N 2013/0081* (2013.01)

(58) Field of Classification Search
None
See application file for complete search history.

(56) References Cited

U.S. PATENT DOCUMENTS

2004/0240725 A1* 12/2004 Xu et al. .................. 382/154
2012/0113093 A1* 5/2012 Liao et al. ................. 345/419

OTHER PUBLICATIONS

Zhang et al., Adaptive Bilateral Filter for Sharpness Enhancement and Noise Removal, IEEE: Transactions on Image Processing, May 2008, pp. 664-678, vol. 17 No. 5.

* cited by examiner

*Primary Examiner* — Daniel Hajnik
(74) *Attorney, Agent, or Firm* — Michael A. Davis, Jr.; Frank D. Cimino

(57) ABSTRACT

A first depth map is generated in response to a stereoscopic image from a camera. The first depth map includes first pixels having valid depths and second pixels having invalid depths. In response to the first depth map, a second depth map is generated for replacing at least some of the second pixels with respective third pixels having valid depths. For generating the second depth map, a particular one of the third pixels is generated for replacing a particular one of the second pixels. For generating the particular third pixel, respective weight(s) is/are assigned to a selected one or more of the first pixels in response to value similarity and spatial proximity between the selected first pixel(s) and the particular second pixel. The particular third pixel is computed in response to the selected first pixel(s) and the weight(s).

27 Claims, 4 Drawing Sheets

METHOD, SYSTEM AND COMPUTER PROGRAM PRODUCT FOR ENHANCING A DEPTH MAP

CROSS-REFERENCE TO RELATED APPLICATION

This application claims priority to U.S. Provisional Patent Application Ser. No. 61/550,686, filed Oct. 24, 2011, entitled METHOD FOR GENERATING DENSE DISPARITY MAP, naming Buyue Zhang et al. as inventors, which is hereby fully incorporated herein by reference for all purposes.

BACKGROUND

The disclosures herein relate in general to image processing, and in particular to a method, system and computer program product for enhancing a depth map.

An image processing system can try to determine respective depths of pixels within a stereoscopic image. Nevertheless, if a pixel's respective depth is indeterminate (e.g., as a result of occlusion, and/or exceeding a search range boundary, within the stereoscopic image), then various operations (e.g., view synthesis, background substitution, and gesture control) of the image processing system are potentially compromised. In attempts to handle this problem, previous techniques (e.g., bilinear interpolation) have introduced other shortcomings, such as blurred edges between different objects and/or different regions within the stereoscopic image.

SUMMARY

A first depth map is generated in response to a stereoscopic image from a camera. The first depth map includes first pixels having valid depths and second pixels having invalid depths. In response to the first depth map, a second depth map is generated for replacing at least some of the second pixels with respective third pixels having valid depths. For generating the second depth map, a particular one of the third pixels is generated for replacing a particular one of the second pixels. For generating the particular third pixel, respective weight(s) is/are assigned to a selected one or more of the first pixels in response to value similarity and spatial proximity between the selected first pixel(s) and the particular second pixel. The particular third pixel is computed in response to the selected first pixel(s) and the weight(s).

DETAILED DESCRIPTION

Figure 1:
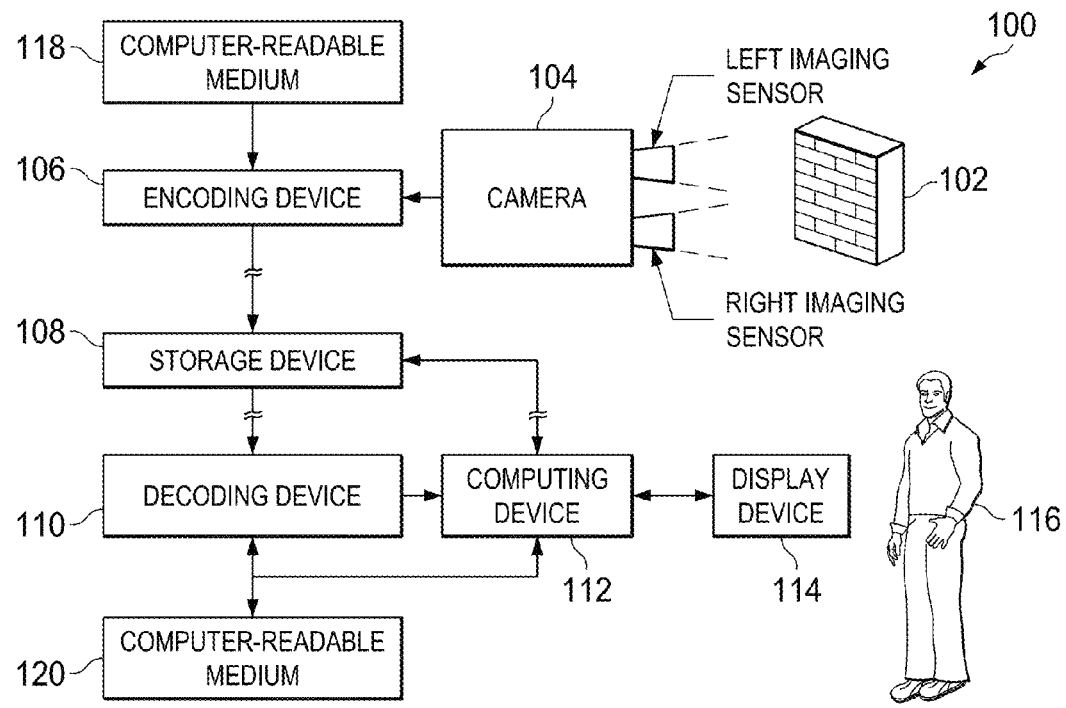
FIG. 1 is a block diagram of an information handling system of the illustrative embodiments.

FIG. 1 is a block diagram of an information handling system (e.g., one or more portable battery-powered electronics devices, such as mobile smartphones), indicated generally at 100, of the illustrative embodiments. In the example of FIG. 1, a scene (e.g., including a physical object 102 and its surrounding foreground and background) is viewed by a stereoscopic camera 104, which: (a) captures and digitizes images of such views; and (b) outputs a video sequence of such digitized (or "digital") images to an encoding device 106. As shown in FIG. 1, the camera 104 includes dual imaging sensors, which are spaced apart from one another, namely: (a) a first imaging sensor for capturing, digitizing and outputting (to the encoding device 106) a first image of a view for a human's left eye; and (b) a second imaging sensor for capturing, digitizing and outputting (to the encoding device 106) a second image of a view for the human's right eye.

The encoding device 106: (a) receives the video sequence from the camera 104; (b) encodes the video sequence into a binary logic bit stream; and (c) outputs the bit stream to a storage device 108, which receives and stores the bit stream. A decoding device 110: (a) reads the bit stream from the storage device 108; (b) in response thereto, decodes the bit stream into the video sequence; and (c) outputs the video sequence to a computing device 112.

The computing device 112: (a) receives the video sequence from the decoding device 110 (e.g., in response to a command from a display device 114, such as a command that a user 116 specifies via a touchscreen of the display device 114); and (b) outputs the video sequence to the display device 114 for display to the user 116. Substantially concurrent with such receiving (from the decoding device 110) and such outputting (to the display device 114) in real-time, the computing device 112 automatically: (a) generates respective depth maps for images of the video sequence, as discussed hereinbelow in connection with FIGS. 2 through 6C; (b) performs various operations (e.g., view synthesis, background substitution, and gesture control on the display device 114) in response to such depth maps, so that results of such operations are displayed to the user 116 by the display device 114; and (c) writes such depth maps for storage into the storage device 108.

The display device 114: (a) receives the video sequence from the computing device 112 (e.g., in response to a command that the user 116 specifies via the touchscreen of the display device 114); and (b) in response thereto, displays the video sequence (e.g., stereoscopic images of the object 102 and its surrounding foreground and background), which is viewable by the user 116 with 3D effect. The display device 114 is any suitable display device that includes a stereoscopic display screen whose optical components enable viewing by the user 116 with 3D effect, such as a suitable plasma display screen, liquid crystal display ("LCD") screen, or light emitting diode ("LED") display screen. In one example, the display device 114 displays a stereoscopic image with 3D effect for viewing by the user 116 through special glasses that: (a) filter the first image against being seen by the right eye of the user 116; and (b) filter the second image against being seen by the left eye of the user 116. In another example, the display device 114 displays the stereoscopic image with 3D effect for viewing by the user 116 without relying on special glasses.

The encoding device 106 performs its operations in response to instructions of computer-readable programs, which are stored on a computer-readable medium 118 (e.g., hard disk drive, nonvolatile flash memory card, and/or other storage device). Also, the computer-readable medium 118 stores a database of information for operations of the encoding device 106. Similarly, the decoding device 110 and the computing device 112 perform their operations in response to instructions of computer-readable programs, which are stored on a computer-readable medium 120. Also, the computer-readable medium 120 stores a database of information for operations of the decoding device 110 and the computing device 112.

The system 100 includes various electronic circuitry components for performing the system 100 operations, implemented in a suitable combination of software, firmware and hardware, such as one or more digital signal processors ("DSPs"), microprocessors, discrete logic devices, application specific integrated circuits ("ASICs"), and field-programmable gate arrays ("FPGAs"). In one embodiment: (a) a first mobile smartphone includes the camera 104, the encoding device 106, and the computer-readable medium 118, which are housed integrally with one another; and (b) a second mobile smartphone includes the decoding device 110, the computing device 112, the display device 114 and the computer-readable medium 120, which are housed integrally with one another.

In an alternative embodiment: (a) the encoding device 106 outputs the bit stream directly to the decoding device 110 via a network, such as a mobile (e.g., cellular) telephone network, a landline telephone network, and/or a computer network (e.g., Ethernet, Internet or intranet); and (b) accordingly, the decoding device 110 receives and processes the bit stream directly from the encoding device 106 substantially in real-time. In such alternative embodiment, the storage device 108 either: (a) concurrently receives (in parallel with the decoding device 110) and stores the bit stream from the encoding device 106; or (b) is absent from the system 100.

Figure 2:
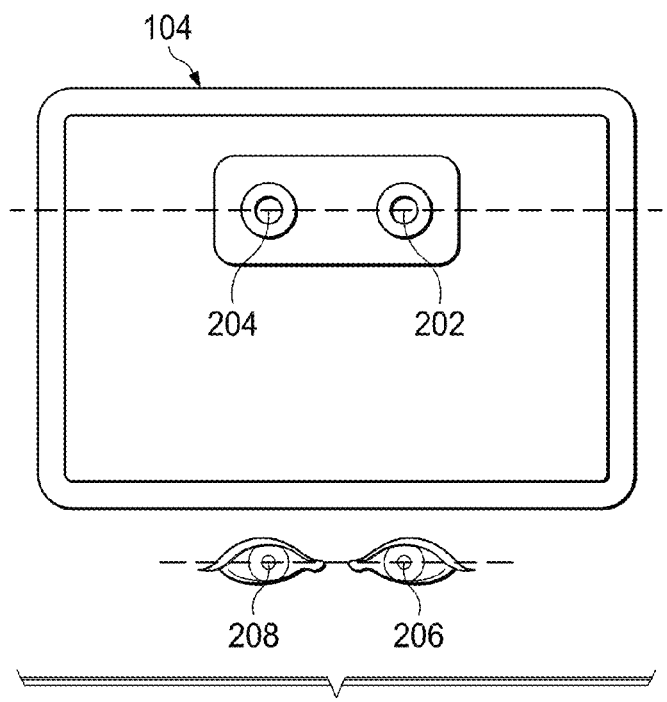
FIG. 2 is a diagram of an example orientation of dual imaging sensors of a camera of FIG. 1.

FIG. 2 is a diagram of an example orientation of the dual imaging sensors 202 and 204 (of the camera 104), in which a line between the sensors 202 and 204 is substantially parallel to a line between eyes 206 and 208 of the user 116. In this example, while the sensors 202 and 204 have such orientation, the camera 104 captures and digitizes images with a landscape aspect ratio.

Figure 3:
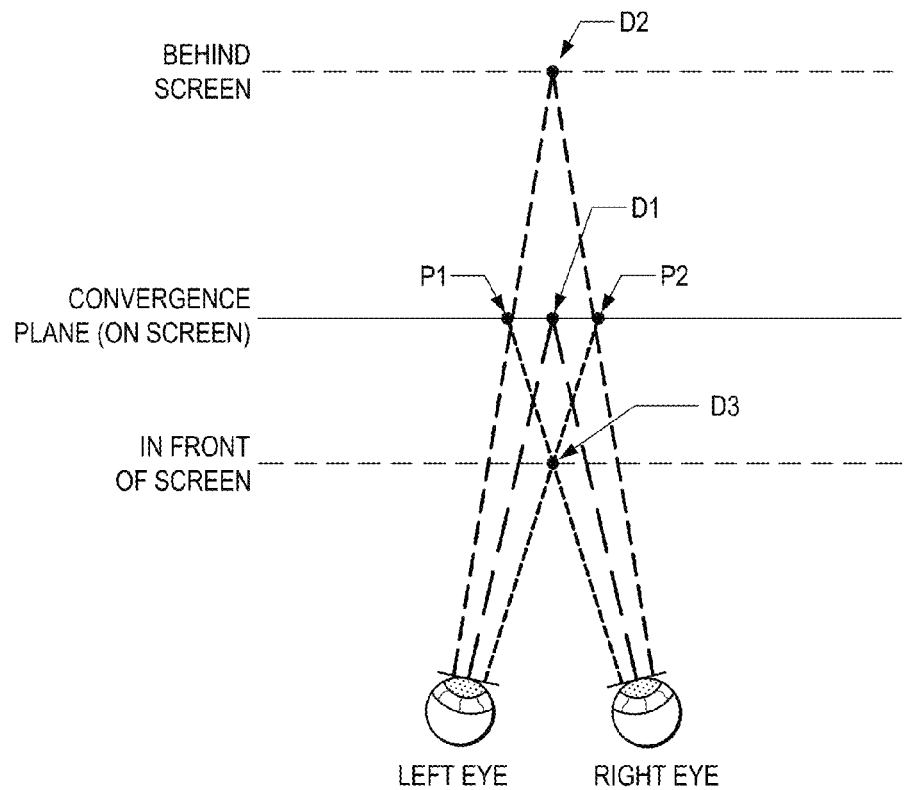
FIG. 3 is a diagram of viewing axes of a human's left and right eyes.

FIG. 3 is a diagram of viewing axes of the left and right eyes of the user 116. In the example of FIG. 3, a stereoscopic image is displayed by the display device 114 on a screen (which is a convergence plane where viewing axes of the left and right eyes naturally converge to intersect). The user 116 experiences the 3D effect by viewing the stereoscopic image on the display device 114, so that various features (e.g., objects) appear on the screen (e.g., at a point D1), behind the screen (e.g., at a point D2), and/or in front of the screen (e.g., at a point D3).

Within the stereoscopic image, a feature's disparity is a horizontal shift between: (a) such feature's location within the first image; and (b) such feature's corresponding location within the second image. The limit of such disparity is dependent on the camera 104. For example, if a feature (within the stereoscopic image) is centered at the point D1 within the first image, and likewise centered at the point D1 within the second image, then: (a) such feature's disparity=D1−D1=0; and (b) the user 116 will perceive the feature to appear at the point D1 on the screen, which is a natural convergence distance away from the left and right eyes.

By comparison, if the feature is centered at a point P1 within the first image, and centered at a point P2 within the second image, then: (a) such feature's disparity=P2−P1 will be positive; and (b) the user 116 will perceive the feature to appear at the point D2 behind the screen, which is greater than the natural convergence distance away from the left and right eyes. Conversely, if the feature is centered at the point P2 within the first image, and centered at the point P1 within the second image, then: (a) such feature's disparity=P1−P2 will be negative; and (b) the user 116 will perceive the feature to appear at the point D3 in front of the screen, which is less than the natural convergence distance away from the left and right eyes. The amount of the feature's disparity (e.g., horizontal shift of the feature from P1 within the first image to P2 within the second image) is measurable as a number of pixels, so that: (a) positive disparity is represented as a positive number; and (b) negative disparity is represented as a negative number.

Figure 4A:
FIG. 4A is an example stereoscopic image received from the camera of FIG. 1.

FIG. 4A is an example pair of images received from the camera 104, including: (a) a first image 402, as captured by the sensor 202, for viewing by the left eye 206; and (b) a second image 404, as captured by the sensor 204, for viewing by the right eye 208. For example, in association with one another, the first and second images 402 and 404 are contemporaneously (e.g., simultaneously) captured, digitized and output (to the encoding device 106) by the sensors 202 and 204, respectively. Accordingly, the first image and its associated second image are a matched pair, which correspond to one another, and which together form a stereoscopic image for viewing by the user 116 with three-dimensional ("3D") effect on the display device 114. In the example of FIG. 4A, disparities (of various features between the first and second images) exist in a horizontal direction, which is parallel to the line between the sensors 202 and 204 in the orientation of FIG. 2.

The computing device 112 receives the matched pair of first and second images from the decoding device 110. Optionally, in response to the database of information (e.g., training information) from the computer-readable medium 120, the computing device 112: (a) identifies (e.g., detects and classifies) various low level features (e.g., colors, edges, textures, focus/blur, object sizes, gradients, and positions) and high level features (e.g., faces, bodies, sky, foliage, and other objects) within the stereoscopic image, such as by performing a mean shift clustering operation to segment the stereoscopic image into regions; and (b) computes disparities of such features (between the first image and its associated second image). The computing device 112 automatically generates a depth map (or "disparity map") that assigns respective depth values to pixels of the stereoscopic image (e.g., in response to such disparities), so that a pixel's depth value indicates such pixel's disparity and vice versa.

Figure 4B:
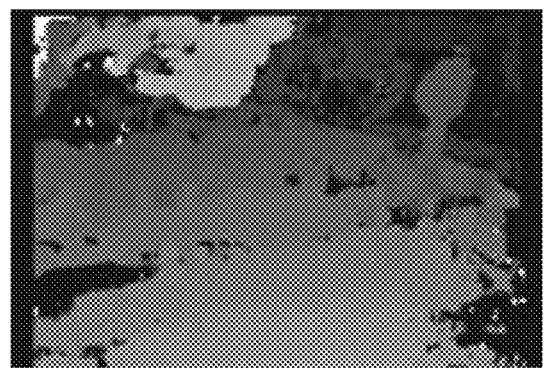
FIG. 4B is an example initial depth map for the stereoscopic image of FIG. 4A.

FIG. 4B is an example initial depth map, which is generated by the computing device 112 in response to the stereoscopic image of FIG. 4A, where: (a) the first image 402 is a reference image; and (b) the second image 404 is a non-reference image. In the example initial depth map of FIG. 4B: (a) brighter intensity pixels ("shallower pixels") indicate relatively nearer depths of their spatially collocated pixels within the reference image, according to various levels of such brighter intensity; (b) darker intensity pixels ("deeper pixels") indicate relatively farther depths of their spatially collocated pixels within the reference image, according to various levels of such darker intensity; and (c) completely black pixels ("indeterminate pixels") indicate that depths of their spatially collocated pixels within the reference image are indeterminate, due to at least one error in the depth map generation by the computing device 112 ("depth error"). The depth errors are caused by one or more conditions (e.g., occlusion, and/or exceeding a search range boundary, within the stereoscopic image of FIG. 4A).

Figure 4C:
FIG. 4C is an example valid/invalid depth mask for the initial depth map of FIG. 4B.

FIG. 4C is an example valid/invalid depth mask, in which: (a) all of the indeterminate pixels are black, which indicates that their spatially collocated pixels have invalid depth values (e.g., depth errors) within the initial depth map (FIG. 4B); and (b) all of the remaining pixels are white, which indicates that their spatially collocated pixels have valid depth values within the initial depth map (FIG. 4B).

Figure 5:
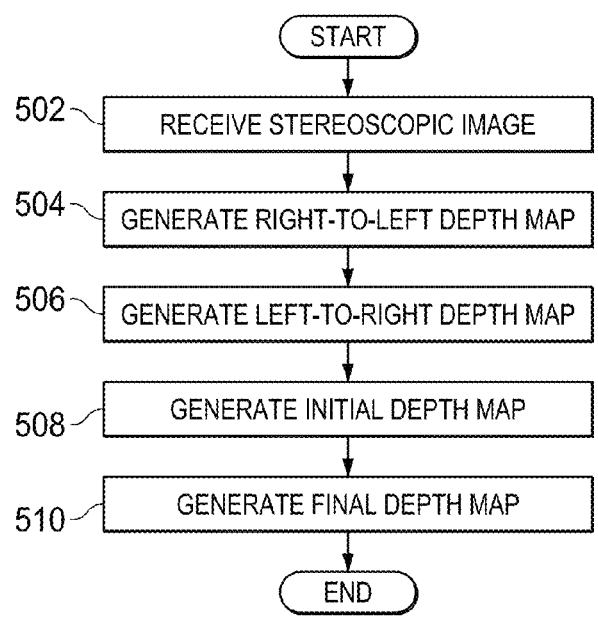
FIG. 5 is a flowchart of an operation of a computing device of FIG. 1.

FIG. 5 is a flowchart of an operation of the computing device 112. At a step 502, the computing device 112 receives a stereoscopic image of the scene from the decoding device 110 (e.g., in response to a command that the user 116 specifies via the touchscreen of the display device 114). The stereoscopic image includes a left image LeftI (e.g., image 402) and a right image RightI (e.g., image 404).

At a next step 504, the computing device 112 generates a right-to-left depth map DBasicR2L(m,n) in response to: (a) the left image LeftI as the reference image; and (b) the right image RightI as the non-reference image. At the step 504, for each pixel RightI(m, n) in the right image RightI, the computing device 112 searches for a corresponding pixel (along a spatially collocated row in the left image LeftI) that most closely matches RightI(m, n). Accordingly, at the step 504, the computing device 112 generates DBasicR2L(m,n) as:

$$DBasicR2L(m, n) = \underset{k}{\operatorname{argmin}}\left\{\sum_{i=-M}^{M}\sum_{j=-N}^{N}|LeftI(m+i, n+j+k) - RightI(m+i, n+j)|, \\ k \in [negR, PosiR]\right\} \quad (1)$$

where M×N is a block size, and [negR, PosiR] is a negative/positive disparity search range. In one example, M=3, N=3, negR=−10%·imageWidth, and PosiR=+10%·imageWidth, where imageWidth is a width of LeftI or RightI.

Similarly, at a next step 506, the computing device 112 generates a left-to-right depth map DBasicL2R(m,n) in response to: (a) the right image RightI as the reference image; and (b) the left image LeftI as the non-reference image. Accordingly, at the step 506, the computing device 112 generates DBasicL2R(m,n) as:

$$DBasicL2R(m, n) = \underset{k}{\operatorname{argmin}}\left\{\sum_{i=-M}^{M}\sum_{j=-N}^{N}|RightI(m+i, n+j+k) - LeftI(m+i, n+j)|, \\ k \in [negR, PosiR]\right\} \quad (2)$$

At a next step 508, the computing device 112 generates an initial depth map Drefine. In one example, an initial value of Drefine is:

$$Drefine \Leftarrow DBasicR2L \quad (3)$$

At the step 508, for each pixel (i, j) in the initial depth map Drefine, where i=1, 2, . . . imageHeight, and j=1, 2, . . . imageWidth, the computing device 112 determines whether such pixel (i, j) is located: (a) in an occluded area; and/or (b) on the boundary of the image. To detect occlusion, the computing device 112 compares: (a) the depth value (or "disparity estimate") for such pixel (i, j) in the right-to-left depth map DBasicR2L; and (b) the depth value for its corresponding pixel (as determined at the step 504) in the left-to-right depth map DBasicL2R. If the two disparity estimates are inconsistent, then the computing device 112: (a) determines that such pixel (i, j) is located in an occluded area; and (b) accordingly, marks such pixel (i, j) as an indeterminate pixel ("hole") within the initial depth map Drefine. Similarly, at the step 508, if the disparity estimate for such pixel (i, j) in the initial depth map Drefine causes an out-of-boundary horizontal shift (exceeding a left or right boundary of the image in a horizontal direction), then the computing device 112 marks such pixel (i, j) as a hole within the initial depth map Drefine.

The computing device 112 operation at the step 508 is summarized in Equations (4), (5), (6) and (7).

$$\text{diff}(i,j) = DBasicL2R(i,j+DBasicR2L(i,j)) + DBasicR2L(i,j) \quad (4)$$

$$\text{If } |\text{diff}(i,j)| > LRThresh, Drefine(i,j) = DISP\_REJECT \quad (5)$$

$$\text{If } (j+DBasicR2L(i,j)) < 1, Drefine(i,j) = DISP\_REJECT \quad (6)$$

$$\text{If } (j+DBasicR2L(i,j)) > \text{imageWidth}, Drefine(i,j) = DISP\_REJECT \quad (7)$$

In one example, the computing device 112 sets: (a) LRThresh to 4 for 8-bit image data; and (b) DISP_REJECT to −200, so that DISP_REJECT is a value outside the negative/positive disparity search range [negR, PosiR].

Various operations (e.g., view synthesis, background substitution, and gesture control) of the computing device 112 would be potentially compromised by the holes in the initial depth map Drefine. To improve those various operations, the computing device 112 generates a final depth map Ddense that: (a) fills such holes by replacing them with pixels that have valid depth values; and (b) preserves edges from within the initial depth map Drefine. Accordingly, the computing device 112 performs those various operations in response to the final depth map Ddense instead of the initial depth map Drefine.

At a next step 510, in response to the initial depth map Drefine(k,l), the computing device 112 implements an adaptive bilateral filter to generate the final depth map Ddense(k, l), which the computing device 112 computes as:

$$Ddense(k, l) = \sum_{m=k-N}^{k+N}\sum_{n=l-N}^{l+N} ABF(m, n; k, l)Drefine(m, n), \quad (8)$$

where ABF(m,n; k,l) is the adaptive bilateral filter for filling the holes. Accordingly, Ddense(k,l) includes no holes, so that all of its pixels have respective valid depth values.

For each hole, whose respective coordinate is [k,l] within Drefine(k,l), the adaptive bilateral filter ABF(m,n; k,l) specifies respective weights of other pixels having valid depth values within a (2N+1)×(2N+1) window that is centered at the coordinate [k,l] within Drefine(k,l). The computing device 112 computes the adaptive bilateral filter ABF(m,n; k,l) as:

$$ABF(m, n; k, l) = \begin{cases} r_{k,l}^{-1}\exp\left(-\left(\frac{(m-k)^2 + (n-l)^2}{2\sigma_d(N)^2}\right)\right)\exp\left(-\frac{\frac{1}{3}\sum_{i=1}^{3}(LeftI(m, n, i) - LeftI(m-k, n-l, i))^2}{2\sigma_r^2}\right), \\ \qquad [m, n] \in \Omega_{k,l} \text{ and } Drefine(m, n) \text{ is valid} \\ 0, \text{ else} \end{cases} \quad (9)$$

where [k,l] is the coordinate of the center pixel of the window, $\sigma_d(\cdot)$ is the standard deviation of the domain Gaussian filter and a function of N, $\sigma_r$ is the standard deviation of the range Gaussian filter, $r_{k,l}$ normalizes volume under the filter to unity as shown in Equation (10), $\Omega_{k,l}=\{[m,n]:[m,n]\in[k-N, k+N]\times[l-N, l+N]\}$, and N is the half size of the window.

$$r_{k,l} = \sum_{m=k-N}^{k+N}\sum_{n=l-N}^{l+N} \exp\left(-\left(\frac{(m-k)^2 + (n-l)^2}{2\sigma_d(N)^2}\right)\right)\exp\left(-\frac{\frac{1}{3}\sum_{i=1}^{3}(LeftI(m, n, i) - LeftI(m-k, n-l, i))^2}{2\sigma_r^2}\right) \quad (10)$$

In this example, Equations (9) and (10) are functions of the left image LeftI, because the initial value of Drefine is DBasicR2L. By comparison, in a different example: (a) the initial value of Drefine is DBasicL2R instead of DBasicR2L; and (b) accordingly, Equations (9) and (10) are functions of the right image RightI instead of the left image LeftI.

Different red-green-blue color ("RGB") values often represent different objects or different regions that: (a) are separated by edges; and/or (b) have different disparities. Accordingly, the adaptive bilateral filter ABF(m,n; k,l) assigns smaller weights to pixels that either: (a) have spatially collocated pixels whose RGB values within LeftI are more different from the RGB value of coordinate [k,l] within LeftI; or (b) are spatially more distant from the center pixel's coordinate [k,l]. Conversely, the adaptive bilateral filter ABF(m,n; k,l) assigns larger weights to pixels that both: (a) have spatially collocated pixels whose RGB values within LeftI are more similar to the RGB value of coordinate [k,l] within LeftI; and (b) are spatially more proximate to the center pixel's coordinate [k,l]. In that manner, the computing device 112 avoids grouping disparities across edges and likewise avoids grouping disparities from different objects.

Figure 6A:
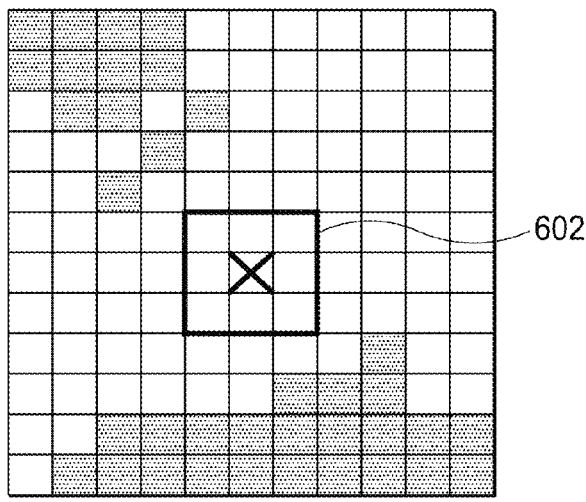
FIG. 6A is a diagram of a first example window for an adaptive bilateral filter of the operation of FIG. 5.
Figure 6B:
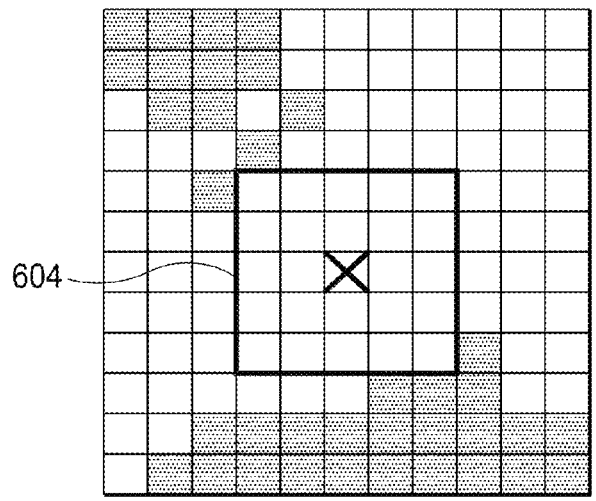
FIG. 6B is a diagram of a second example window for the adaptive bilateral filter of the operation of FIG. 5.
Figure 6C:
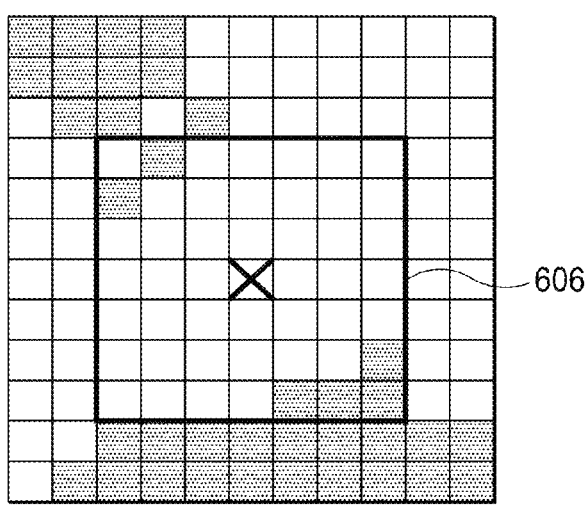
FIG. 6C is a diagram of a third example window for the adaptive bilateral filter of the operation of FIG. 5.

FIG. 6A is a diagram of a first example (2N+1)×(2N+1) window 602 for the adaptive bilateral filter ABF(m,n; k,l), within a representative portion of the initial depth map Drefine. FIG. 6B is a diagram of a second example (2N+1)×(2N+1) window 604 for the adaptive bilateral filter ABF(m,n; k,l), within the representative portion of the initial depth map Drefine. FIG. 6C is a diagram of a third example (2N+1)×(2N+1) window 606 for the adaptive bilateral filter ABF(m,n; k,l), within the representative portion of the initial depth map Drefine. The center pixel's coordinate [k,l] is indicated by an "X" in FIGS. 6A through 6C.

For clarity, in FIGS. 6A through 6C, white pixels are holes, and black pixels have valid depth values. To fill such holes, the computing device 112 adaptively grows the half size N of the (2N+1)×(2N+1) window, which is centered at the coordinate [k,l]. The computing device 112: (a) starts with N=1, so that the (2N+1)×(2N+1) window is initially the 3×3 window 602 (FIG. 6A); and (b) determines whether the 3×3 window 602 includes at least one pixel that has a valid depth value. In the example of FIG. 6A, the 3×3 window 602 includes only holes.

In response to determining that the 3×3 window 602 includes only holes, the computing device 112: (a) increases N by 1, so that N=2, which grows the (2N+1)×(2N+1) window into the 5×5 window 604 (FIG. 6B); and (b) determines whether the 5×5 window 604 includes at least one pixel that has a valid depth value. In the example of FIG. 6B, the 5×5 window 604 includes only holes.

In the same manner, the computing device 112 continues increasing N by a successive increment of 1 until at least one pixel has a valid depth value within the (2N+1)×(2N+1) window. Accordingly, in response to determining that the 5×5 window 604 includes only holes, the computing device 112: (a) increases N by 1, so that N=3, which grows the (2N+1)×(2N+1) window into the 7×7 window 606 (FIG. 6C); and (b) determines whether the 7×7 window 606 includes at least one pixel that has a valid depth value. In the example of FIG. 6C, the 7×7 window 606 includes six pixels that have valid depth values, so the final value for N is 3.

Moreover, a threshold in the domain Gaussian filter $\sigma_d(N)$ is a function of N, as follows:

$$\sigma_d(N) = \frac{N}{2} \quad (11)$$

In the illustrative embodiments, a computer program product is an article of manufacture that has: (a) a computer-readable medium; and (b) a computer-readable program that is stored on such medium. Such program is processable by an instruction execution apparatus (e.g., system or device) for causing the apparatus to perform various operations discussed hereinabove (e.g., discussed in connection with a block diagram). For example, in response to processing (e.g., executing) such program's instructions, the apparatus (e.g., programmable information handling system) performs various operations discussed hereinabove. Accordingly, such operations are computer-implemented.

Such program (e.g., software, firmware, and/or microcode) is written in one or more programming languages, such as: an object-oriented programming language (e.g., C++); a procedural programming language (e.g., C); and/or any suitable combination thereof. In a first example, the computer-readable medium is a computer-readable storage medium. In a second example, the computer-readable medium is a computer-readable signal medium.

A computer-readable storage medium includes any system, device and/or other non-transitory tangible apparatus (e.g., electronic, magnetic, optical, electromagnetic, infrared, semiconductor, and/or any suitable combination thereof) that is suitable for storing a program, so that such program is processable by an instruction execution apparatus for causing the apparatus to perform various operations discussed hereinabove. Examples of a computer-readable storage medium include, but are not limited to: an electrical connection having one or more wires; a portable computer diskette; a hard disk; a random access memory ("RAM"); a read-only memory ("ROM"); an erasable programmable read-only memory ("EPROM" or flash memory); an optical fiber; a portable compact disc read-only memory ("CD-ROM"); an optical storage device; a magnetic storage device; and/or any suitable combination thereof.

A computer-readable signal medium includes any computer-readable medium (other than a computer-readable storage medium) that is suitable for communicating (e.g., propagating or transmitting) a program, so that such program is processable by an instruction execution apparatus for causing the apparatus to perform various operations discussed hereinabove. In one example, a computer-readable signal medium includes a data signal having computer-readable program code embodied therein (e.g., in baseband or as part of a carrier wave), which is communicated (e.g., electronically, electromagnetically, and/or optically) via wireline, wireless, optical fiber cable, and/or any suitable combination thereof.

Although illustrative embodiments have been shown and described by way of example, a wide range of alternative embodiments is possible within the scope of the foregoing disclosure.

What is claimed is:

1. A method performed by at least one device for enhancing a depth map, the method comprising:
   generating a first depth map in response to a stereoscopic image from a camera, wherein the first depth map includes first pixels having valid depths and second pixels having invalid depths; and
   in response to the first depth map, generating a second depth map for replacing at least some of the second pixels with respective third pixels having valid depths, wherein generating the second depth map includes generating a particular one of the third pixels for replacing a particular one of the second pixels, and wherein generating the particular third pixel includes assigning respective weight(s) to a selected one or more of the first pixels in response to value similarity and spatial proximity between the selected first pixel(s) and the particular second pixel, and wherein generating the particular third pixel includes computing the particular third pixel in response to the selected first pixel(s) and the weight(s);
   wherein the stereoscopic image includes first and second images, and wherein generating the first depth map includes: generating a third depth map in response to the first image as a reference image and the second image as a non-reference image; generating a fourth depth map in response to the second image as the reference image and the first image as the non-reference image; and generating the first depth map in response to the third and fourth depth maps.

2. The method of claim 1, wherein at least first ones of the invalid depths are caused by occlusion within the stereoscopic image, and at least second ones of the invalid depths are caused by exceeding a boundary of the stereoscopic image.

3. The method of claim 1, wherein value similarity includes similarity of color value.

4. The method of claim 1, wherein a window includes all of the selected first pixel(s).

5. The method of claim 4, wherein the window includes all of the selected first pixel(s) and a different one or more of the second pixels.

6. The method of claim 4, wherein the window is centered at the particular second pixel.

7. The method of claim 6, wherein generating the particular third pixel includes growing a size of the window until it includes at least one of the first pixels for being the selected first pixel(s).

8. The method of claim 6, wherein assigning respective weight(s) includes assigning the weight(s) in response to a size of the window.

9. The method of claim 1, and comprising:
   performing a display operation on a display device in response to the second depth map, wherein the display operation includes at least one of: view synthesis; background substitution; and gesture control.

10. A system for enhancing a depth map, the system comprising:
    a combination of electronic circuitry components for: generating a first depth map in response to a stereoscopic image from a camera, wherein the first depth map includes first pixels having valid depths and second pixels having invalid depths; and, in response to the first depth map, generating a second depth map for replacing at least some of the second pixels with respective third pixels having valid depths, wherein generating the second depth map includes generating a particular one of the third pixels for replacing a particular one of the second pixels, and wherein generating the particular third pixel includes assigning respective weight(s) to a selected one or more of the first pixels in response to value similarity and spatial proximity between the selected first pixel(s) and the particular second pixel, and wherein generating the particular third pixel includes computing the particular third pixel in response to the selected first pixel(s) and the weight(s);
    wherein the stereoscopic image includes first and second images, and wherein generating the first depth map includes: generating a third depth map in response to the first image as a reference image and the second image as a non-reference image; generating a fourth depth map in response to the second image as the reference image and the first image as the non-reference image; and generating the first depth map in response to the third and fourth depth maps.

11. The system of claim 10, wherein at least first ones of the invalid depths are caused by occlusion within the stereoscopic image, and at least second ones of the invalid depths are caused by exceeding a boundary of the stereoscopic image.

12. The system of claim 10, wherein value similarity includes similarity of color value.

13. The system of claim 10, wherein a window includes all of the selected first pixel(s).

14. The system of claim 13, wherein the window includes all of the selected first pixel(s) and a different one or more of the second pixels.

15. The system of claim 13, wherein the window is centered at the particular second pixel.

16. The system of claim 15, wherein generating the particular third pixel includes growing a size of the window until it includes at least one of the first pixels for being the selected first pixel(s).

17. The system of claim 15, wherein assigning respective weight(s) includes assigning the weight(s) in response to a size of the window.

18. The system of claim 10, wherein the combination of electronic circuitry components is for performing a display operation on a display device in response to the second depth map, and wherein the display operation includes at least one of: view synthesis; background substitution; and gesture control.

19. A computer program product for enhancing a depth map, the computer program product comprising:
a non-transitory computer-readable storage medium; and
a computer-readable program stored on the computer-readable storage medium, wherein the computer-readable program is processable by an information handling system for causing the information handling system to perform operations including: generating a first depth map in response to a stereoscopic image from a camera, wherein the first depth map includes first pixels having valid depths and second pixels having invalid depths; and, in response to the first depth map, generating a second depth map for replacing at least some of the second pixels with respective third pixels having valid depths, wherein generating the second depth map includes generating a particular one of the third pixels for replacing a particular one of the second pixels, and wherein generating the particular third pixel includes assigning respective weight(s) to a selected one or more of the first pixels in response to value similarity and spatial proximity between the selected first pixel(s) and the particular second pixel, and wherein generating the particular third pixel includes computing the particular third pixel in response to the selected first pixel(s) and the weight(s);
wherein the stereoscopic image includes first and second images, and wherein generating the first depth map includes: generating a third depth map in response to the first image as a reference image and the second image as a non-reference image; generating a fourth depth map in response to the second image as the reference image and the first image as the non-reference image; and generating the first depth map in response to the third and fourth depth maps.

20. The computer program product of claim 19, wherein at least first ones of the invalid depths are caused by occlusion within the stereoscopic image, and at least second ones of the invalid depths are caused by exceeding a boundary of the stereoscopic image.

21. The computer program product of claim 19, wherein value similarity includes similarity of color value.

22. The computer program product of claim 19, wherein a window includes all of the selected first pixel(s).

23. The computer program product of claim 22, wherein the window includes all of the selected first pixel(s) and a different one or more of the second pixels.

24. The computer program product of claim 22, wherein the window is centered at the particular second pixel.

25. The computer program product of claim 24, wherein generating the particular third pixel includes growing a size of the window until it includes at least one of the first pixels for being the selected first pixel(s).

26. The computer program product of claim 24, wherein assigning respective weight(s) includes assigning the weight(s) in response to a size of the window.

27. The computer program product of claim 19, wherein the operations include performing a display operation on a display device in response to the second depth map, and wherein the display operation includes at least one of: view synthesis; background substitution; and gesture control.

* * * * *